US012570853B2

(12) United States Patent
Suzuki et al.

(10) Patent No.: US 12,570,853 B2
(45) Date of Patent: Mar. 10, 2026

(54) SILICONE ADSORPTION FILM

(71) Applicant: FUJICOPIAN Co., Ltd., Osaka (JP)

(72) Inventors: Kyouichi Suzuki, Osaka (JP); Shun Mukai, Osaka (JP)

(73) Assignee: FUJICOPIAN Co., Ltd., Osaka (JP)

( * ) Notice: Subject to any disclaimer, the term of this patent is extended or adjusted under 35 U.S.C. 154(b) by 591 days.

(21) Appl. No.: 17/759,586

(22) PCT Filed: Feb. 3, 2021

(86) PCT No.: PCT/JP2021/003839
§ 371 (c)(1),
(2) Date: Jul. 27, 2022

(87) PCT Pub. No.: WO2021/157597
PCT Pub. Date: Aug. 12, 2021

(65) Prior Publication Data

US 2023/0100526 A1 Mar. 30, 2023

(30) Foreign Application Priority Data

Feb. 7, 2020 (JP) ................................ 2020-019718

(51) Int. Cl.

| | |
|---|---|
| ***C08L 83/04*** | (2006.01) |
| ***B32B 7/12*** | (2006.01) |
| ***B32B 27/08*** | (2006.01) |
| ***B32B 27/16*** | (2006.01) |
| ***B32B 27/36*** | (2006.01) |
| ***C09J 133/08*** | (2006.01) |

(52) U.S. Cl.
CPC ............ *C08L 83/04* (2013.01); *C09J 133/08* (2013.01); *B32B 7/12* (2013.01); *B32B 27/08* (2013.01); *B32B 27/16* (2013.01); *B32B 27/36* (2013.01); *B32B 2250/244* (2013.01); *B32B 2255/10* (2013.01); *B32B 2255/26* (2013.01); *B32B 2255/28* (2013.01); *B32B 2307/206* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | | | |
|---|---|---|---|---|
| 4,399,247 A * | 8/1983 | Ona | C08K 5/09 | 252/8.61 |
| 4,526,953 A * | 7/1985 | Dallavia, Jr. | C08L 83/04 | 528/31 |
| 5,373,078 A * | 12/1994 | Juen | C08L 83/04 | 525/478 |
| 2015/0140345 A1* | 5/2015 | Fukushima | C08J 7/042 | 427/140 |

FOREIGN PATENT DOCUMENTS

| | | |
|---|---|---|
| JP | 2014-108498 A | 6/2014 |
| JP | 2015-117348 A | 6/2015 |
| JP | 2015-186871 A | 10/2015 |
| JP | 2017-115077 A | 6/2017 |
| JP | 2019-026724 A | 2/2019 |
| JP | 2019-077750 A | 5/2019 |

OTHER PUBLICATIONS

International Search Report in PCT/JP2021/003839, issued Apr. 27, 2021.

* cited by examiner

*Primary Examiner* — Sheeba Ahmed
(74) *Attorney, Agent, or Firm* — Knobbe, Martens, Olson & Bear, LLP

(57) ABSTRACT

Provided is a silicone adsorption film that excels in both adsorption to a smooth surface and the suppression of remnants of glue on the smooth surface after detachment. The silicone adsorption film comprises a base material layer and a silicone adsorption layer laminated on the base material layer. The silicone adsorption layer is a cured product of a crosslinkable composition containing (a) a crosslinkable organopolysiloxane, (b) a crosslinking agent, (c) a non-reactive MQ resin and (d) a reactive MQ resin. The silicone adsorption film excels in both adsorption to a smooth surface and the suppression of remnants of glue on the smooth surface after detachment.

13 Claims, 3 Drawing Sheets

SILICONE ADSORPTION FILM

TECHNICAL FIELD

The present invention relates to a silicone adsorption film. Specifically, the present invention relates to a silicone adsorption film to be peeled off from a smooth surface, the silicone adsorption film excelling in adsorption to the smooth surface and suppression of remnants of glue on the smooth surface after detachment. Preferably, the present invention relates to a silicone adsorption film used for fixing a polishing pad by being interposed between a platen of a polishing apparatus and the polishing pad, the silicone adsorption film excelling in adsorption to the platen of the polishing apparatus and suppression of remnants of glue on the platen after detachment.

BACKGROUND ART

In a process of manufacturing a semiconductor component and an electronic component such as a semiconductor wafer, a substrate for a hard disk, and a glass substrate for a display, polishing is performed to planarize or mirror a substrate surface. In these polishing steps, the polishing pad is fixed to the platen of the polishing apparatus, and a member to be polished and the polishing pad are slid in a pressurized state while a polishing slurry is supplied onto a surface of a polishing layer of the polishing pad. In order to improve work efficiency of replacing and fixing the polishing pad, conventionally, in a polishing pad in which an adsorption layer, a base material, and a polishing layer are laminated in this order as disclosed in Patent Document 1 or the like, a self-adhesive material formed of a silicone resin is used as a material of the adsorption layer.

In general, a silicone adsorption layer composed of the self-adhesive material formed of a silicone resin is hardly displaced with respect to a direction parallel to an adherend surface, exhibits strong adsorption even in a direction perpendicular to the adherend surface, and also has a property of being easily peeled off from an end of the silicone adsorption layer. In addition, when the silicone adsorption layer peeled off from the adherend surface is attached to the adherend surface again, the silicone adsorption layer is strongly adsorbed to the adherend surface again. As described above, the property of being easily peeled off from the adherend surface and the property of being strongly adsorbed to the adherend surface again are collectively referred to as reworkability.

Due to such reworkability, when the silicone adsorption layer is used for fixing the polishing pad, the silicone adsorption layer can be easily detached from the platen of the polishing apparatus when the polishing pad is replaced, and even if the polishing pad is attached to an incorrect position, the polishing pad can be easily reattached. In addition, even after the silicone adsorption layer is once peeled off from the platen, when the silicone adsorption layer is attached to the platen again, the silicone adsorption layer can be strongly adsorbed to continue fixing the polishing pad during polishing. For this reason, the silicone adsorption layer greatly contributes to improvement in efficiency of replacement and fixing work of the polishing pad.

PRIOR ART DOCUMENT

Patent Document

Patent Document 1: Japanese Patent Laid-open Publication No. 2014-108498

SUMMARY OF THE INVENTION

Problems to be Solved by the Invention

In recent years, in order to improve efficiency of polishing work, it is required to increase the speed of polishing work itself. When the polishing work is speeded up, while load applied to the adsorption layer fixing the polishing pad increases, the load in the direction parallel to the adherend surface increases in the silicone adsorption layer being polished, and therefore, partial detachment easily occurs in the silicone adsorption layer. When the silicone adsorption layer is partially detached during polishing, the polishing pad cannot be continuously fixed stably, and desired polishing is not performed on a member to be polished, or a polishing powder enters a detached portion, so that reworkability is lost.

The present inventor has attempted to blend a non-reactive MQ resin into a curable (crosslinkable) composition used for forming a silicone adsorption layer in order to prevent partial detachment of the polishing pad caused by speeding up of the polishing work by increasing an adsorption power of the silicone adsorption layer. However, when the adsorption power of the silicone adsorption layer is increased in this way, there is a problem that a phenomenon (so-called remnants of glue) in which silicone remains on an adherend surface (platen) occurs when the silicone adsorption layer is detached for replacement of the polishing pad. When remnants of glue occurs on the platen, the silicone adsorption layer of the polishing pad to be attached next cannot be brought into close contact with the platen, and therefore, the polishing pad is easily peeled off. In addition, since the polishing pad is inclined and fixed to the member to be polished, the polishing pad cannot uniformly pressurize the member to be polished, so that desired polishing may not be performed on the member to be polished. As described above, in the silicone adsorption layer to be adsorbed to the smooth surface such as the platen, both improvement of the adsorption to the smooth surface and suppression of remnants of glue on the smooth surface after detachment cannot be essentially achieved, and it is not possible to sufficiently respond to the demand for increasing the speed of the polishing work itself.

Thus, an object of the present invention is to provide a silicone adsorption film that excels in both adsorption to a smooth surface and suppression of remnants of glue on the smooth surface after detachment.

Means for Solving the Problem

The present inventor has extensively conducted studies, and resultantly found that when a non-reactive MQ resin and a reactive MQ resin are used in combination with a crosslinkable polyorganosiloxane and a crosslinking agent as crosslinkable compositions for forming a silicone adsorption layer, a silicone adsorption film is obtained as being excellent in both adsorption to a smooth surface and suppression of remnants of glue on the smooth surface after detachment. The present invention was completed as a result of further research conducted based on these findings.

In summary, the present invention provides aspects of invention as itemized below.

Item 1. A silicone adsorption film including a base material layer and a silicone adsorption layer stacked on the base material layer, wherein the silicone adsorption layer is a cured product of a crosslinkable composition containing (a) a crosslinkable organopolysiloxane, (b) a crosslinking agent, (c) a non-reactive MQ resin, and (d) a reactive MQ resin.

Item 2. The silicone adsorption film according to item 1, wherein 43 to 100 parts by weight of the component (c) and 1.1 to 10.6 parts by weight of the component (d) are contained per 100 parts by weight of a total amount of the component (a) and the component (b).

Item 3. The silicone adsorption film according to item 1 or 2, wherein the component (a) is a diorganopolysiloxane containing two or more alkenyl groups in one molecule.

Item 4. The silicone adsorption film according to any one of items 1 to 3, wherein the component (b) is an organohydrogenpolysiloxane.

Item 5. The silicone adsorption film according to any one of items 1 to 4, wherein a thickness of the silicone adsorption layer is 15 to 30 μm.

Item 6. The silicone adsorption film according to any one of items 1 to 5, wherein a storage elastic modulus of the silicone adsorption layer is $5\times10^4$ to $15\times10^4$ Pa.

Item 7. The silicone adsorption film according to any one of items 1 to 6, wherein an anchor layer is included between the base material layer and the silicone adsorption layer, and the anchor layer is selected from the group consisting of a polyester-based resin, an acryl-based resin, and a urethane-based resin.

Item 8. The silicone adsorption film according to any one of items 1 to 7, which is used for fixing the silicone adsorption layer to a platen of a polishing apparatus and fixing a polishing pad to a side of the base material layer.

Advantages of the Invention

According to the present invention, there is provided a silicone adsorption film that excels in both adsorption to a smooth surface and the suppression of remnants of glue on the smooth surface after detachment.

EMBODIMENTS OF THE INVENTION

A silicone adsorption film of the present invention includes a base material layer and a silicone adsorption layer stacked on the base material layer, in which the silicone adsorption layer is a cured product of a crosslinkable composition containing (a) a crosslinkable organopolysiloxane, (b) a crosslinking agent, (c) a non-reactive MQ resin, and (d) a reactive MQ resin. Hereinafter, the silicone adsorption film of the present invention will be described in detail.

Layer Configuration and Embodiment of Use

Figure 1:
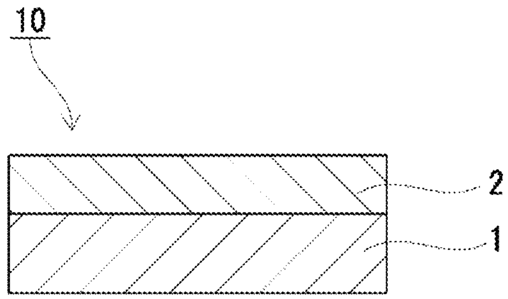
FIG. 1 shows an example of a layer configuration of a silicone adsorption film.
Figure 2:
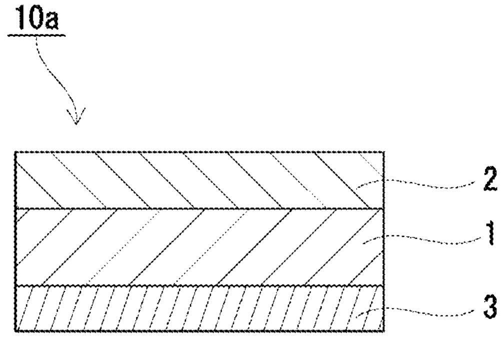
FIG. 2 shows an example of the layer configuration of the silicone adsorption film.
Figure 3:
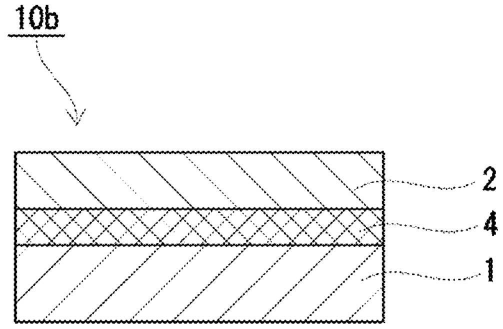
FIG. 3 shows an example of the layer configuration of the silicone adsorption film.

FIGS. 1 to 3 show an example of a layer configuration of the silicone adsorption film. The silicone adsorption film of the present invention is a laminate including a base material layer 1 and a silicone adsorption layer 2 directly stacked on the base material layer 1 as in a silicone adsorption film 10 shown in FIG. 1. Further, the silicone adsorption film of the present invention may further include a pressure-sensitive adhesive layer 3 on the base material layer 1 side of the silicone adsorption film 10 of FIG. 1 as in a silicone adsorption film 10*a* shown in FIG. 2. Furthermore, the silicone adsorption film of the present invention may be a laminate including the base material layer 1 and a silicone adsorption layer 2 stacked on the base material layer 1 with an anchor layer 4 interposed therebetween, as in a silicone adsorption film 10*b* shown in FIG. 3. Although not shown, the silicone adsorption film 10*b* shown in FIG. 3 may further have adhesiveness 3 on the base material layer 1 side as in the silicone adsorption film 10*a* of FIG. 2.

Figure 4:
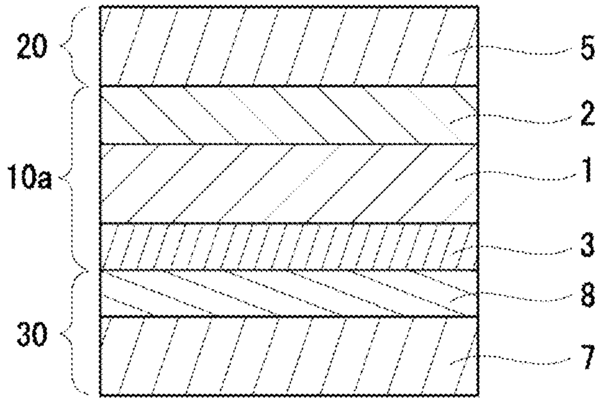
FIG. 4 shows an example of a state before the silicone adsorption film is used.
Figure 5:
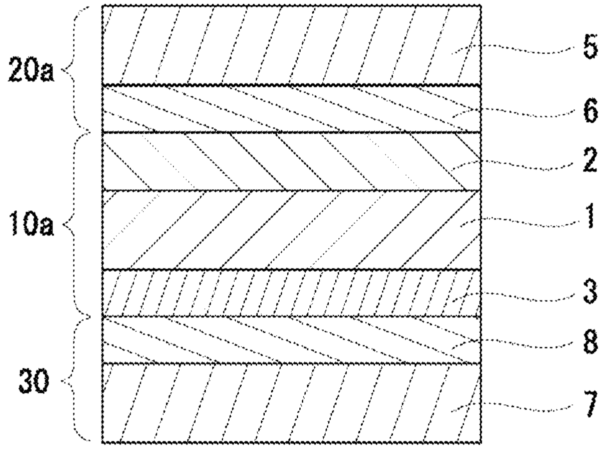
FIG. 5 shows an example of the state before the silicone adsorption film is used.

In the silicone adsorption film of the present invention, another layer for protecting a layer having stickiness may be stacked before the silicone adsorption film is used. For example, in the case of the silicone adsorption film 10*a* shown in FIG. 2, as shown in FIG. 4, the separator 20 having a base material layer 5 may be stacked on the silicone adsorption layer 2, and a cover film 30 having a base material layer 7 and a release layer 8 may be stacked on the pressure-sensitive adhesive layer 3. In addition, as shown in FIG. 5, a separator 20*a* having the base material layer 5 and a release layer 6 may be stacked on the silicone adsorption layer 2, and the cover film 30 having the base material layer 7 and the release layer 8 may be stacked on the pressure-sensitive adhesive layer 3. The separators 20 and 20*a* and the cover film 30 are detached when the silicone adsorption film 10*a* is used.

Figure 6:
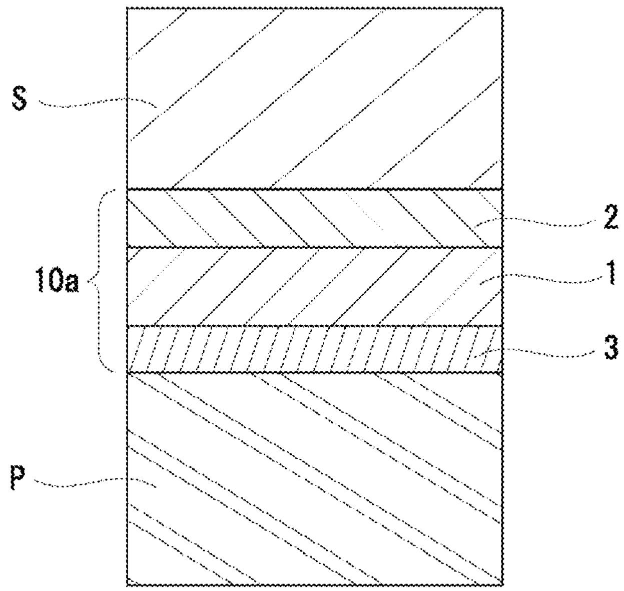
FIG. 6 shows an example of a state at the time of use of the silicone adsorption film.

The silicone adsorption film of the present invention is used by adsorbing the silicone adsorption layer 2 side to a smooth surface. For example, in the case of the silicone adsorption film 10*a* shown in FIG. 2, preferably, as shown in FIG. 6, the polishing member P is fixed to a platen S by adsorbing the silicone adsorption layer 2 side to the platen S and bonding the polishing member P to the pressure-sensitive adhesive layer 3 side.

Base Material Layer

As a material of the base material layer, various plastics can be used without particular limitation, and examples thereof include polyolefin (polyethylene, polypropylene, and the like), polyester (Polyethylene terephthalate, polybutylene terephthalate, polyethylene naphthalate, polybutylene naphthalate, copolymerized polyester, and the like), polyamide (nylon 6, nylon 66, a copolymer of nylon 6 and nylon 66, nylon 6, 10, polymethaxylylene adipamide (MXD6), and the like), polycarbonate, triacetyl cellulose, a fluororesin, polyphenylene oxide, polyimide, polyamideimide, an acrylic resin, polyvinyl chloride, polyvinylidene chloride, and polyacrylonitrile. Among these materials, polyester and polycarbonate are preferable from the viewpoint of handleability, cost, and the like at the time of thermal crosslinking of the crosslinkable composition for forming the silicone adsorption layer, polyester is more preferable from the viewpoint of transparency, and polyethylene terephthalate is still more preferable.

The thickness of the base material layer is not particularly limited, and the thickness is usually 5 to 400 μm, preferably 20 to 250 μm, more preferably 30 to 150 μm, and still more preferably 40 to 80 μm.

Specific examples of the form of the base material layer include a film formed of the above materials.

The surface of the base material layer may be modified by plasma treatment or flame treatment, preferably plasma treatment, for the purpose of, for example, improving adhesion with the silicone adsorption layer or the anchor layer provided as necessary, and/or imparting antistatic performance.

Silicone Adsorption Layer

The silicone adsorption layer is a cured product of a crosslinkable composition containing (a) a crosslinkable organopolysiloxane (hereinafter, also described as component (a)), (b) a crosslinking agent (hereinafter, also described as component (b)), (c) a non-reactive MQ resin (hereinafter, also described as component (C)), and (d) a reactive MQ resin (hereinafter, also described as component (d)).

The silicone adsorption layer has flexibility and self-stickiness like rubber, and when the silicone adsorption layer is composed of a cured product of the above mentioned crosslinkable composition, the silicone adsorption layer exhibits an excellent effect in both adsorption to the smooth surface and suppression of remnants of glue to the smooth surface after detachment.

((a) Crosslinkable Organopolysiloxane)

(a) The crosslinkable organopolysiloxane as a component is not particularly limited as long as it is an organopolysiloxane having a crosslinkable group, and preferred examples thereof include a diorganopolysiloxane having two or more alkenyl groups in one molecule.

In the diorganopolysiloxane having two or more alkenyl groups in one molecule, examples of the structure of the diorganosiloxane moiety include a linear form having a main chain composed of repeating diorganosiloxane units, or optionally a branched form further having a branched chain composed of repeating diorganosiloxane or diorganosiloxane units. Furthermore, in the diorganopolysiloxane having two or more alkenyl groups in one molecule, a bonding site of the alkenyl group is not particularly limited, and examples thereof include an end of the diorganosiloxane moiety, more specifically, only both ends of a linear diorganopolysiloxane; only both ends of a main chain of a branched diorganopolysiloxane; and both ends of the main chain and an end of a side chain of the branched diorganopolysiloxane.

Specific examples of the diorganopolysiloxane having two or more alkenyl groups in one molecule used in the present invention are represented by the following formulas (1-1) to (1-3) and (2). The following formulas (1-1) to (1-3) are examples of a linear diorganopolysiloxane having two alkenyl groups in one molecule, and the following formula (2) is an example of a branched diorganopolysiloxane having two or more alkenyl groups in one molecule.

[Chem. 1]

(1-1)

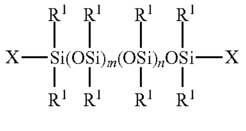

(1-2)

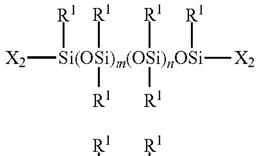

(1-3)

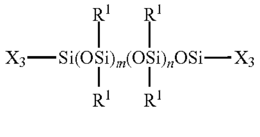

-continued (2)

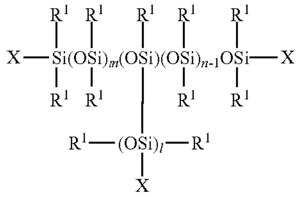

In the formulas (1-1) to (1-3) and (2), $R^1$ represents an organic group which may be the same or different from each other, X represents an alkenyl group, and n, m, and l represent integers.

Preferable examples of $R^1$ include alkyl groups having 1 to 10 carbon atoms, and preferably 1 to 6 carbon atoms, more preferably alkyl groups such as a methyl group, an ethyl group, and a propyl group; cycloalkyl groups; cycloalkyl groups such as a cyclopentyl group, a cyclohexyl group, and a cycloheptyl group; aryl groups such as a phenyl group, a tolyl group, a xylyl group, a naphthyl group, and a biphenylyl group; aralkyl groups such as a benzyl group, a phenylethyl group, a phenylpropyl group, and a methylbenzyl group; and groups in which at least some of the hydrogen atoms bonded to the carbon atoms of these groups are substituted with a halogen atom such as fluorine, chlorine, or bromine, cyano, or the like, an alkyl group is preferably mentioned, and a methyl group is more preferably mentioned. In particular, in the compounds of Formulas (1-1) to (1-3) and (2), it is preferable that at least 50% of $R^1$ is occupied by a methyl group in one molecule.

Preferable examples of X include an alkenyl group having 2 to 8 carbon atoms, preferably a vinyl group, an allyl group, a propenyl group, an isopropenyl group, a butenyl group, a hexenyl group, and a cyclohexenyl group, and more preferably a vinyl group. The compound of the formula (2) is the same as the linear formula (1-1) in having one alkenyl group per one end except that the polyorganosiloxane moiety is branched, but may be changed to have two or three alkenyl groups per one end as in the formulas (1-2) and (1-3).

n is an integer of 0 or more (in the case of the formulas (1-1) to (1-3)) or an integer of 1 or more (in the case of the formula (2)), m is an integer of 0 or more, and l is an integer of 1 or more. n and m preferably satisfy $10 \leq n+m \leq 10{,}000$, and more preferably $50 \leq n+m \leq 2{,}000$.

These crosslinkable organopolysiloxanes may be used singly or in combination of two or more kinds thereof.

A weight average molecular weight (Mw) of the crosslinkable organopolysiloxane is, for example, 20,000 or more, preferably 50,000 or more, more preferably 70,000 or more from the viewpoint of preferably obtaining curability and adhesive strength, and is, for example, 600,000 or less, preferably 300,000 or less, more preferably 100,000 or less from the viewpoint of securing a viscosity that is not too high and facilitates stirring during production. The weight average molecular weight Mw is a molecular weight in terms of polystyrene measured by gel permeation chromatography (GPC). Definition of each of Mn and Mw is described in "Kobunshi Kagaku No Kiso (Fundamentals of Polymer Chemistry)" (edited by Society of Polymer Science, Japan, published by Tokyo Kagaku Dojin, 1978) and the like, and these values can be calculated from the molecular weight distribution curve obtained by GPC (the same applies hereinafter).

((b) Crosslinking Agent)

The crosslinking agent as the component (b) is not particularly limited as long as it has a hydrosilyl group (SiH group) for crosslinking the component (a). By crosslinking, the silicone adsorption layer has flexibility like rubber, and this flexibility exhibits excellent adhesion between the silicone adsorption layer and an adherend.

Examples of the crosslinking agent preferably include an organohydrogenpolysiloxane. The organohydrogenpolysiloxane contains two or more, preferably three or more hydrosilyl groups in one molecule, and may be a resinous substance having, for example, a linear, branched, cyclic or three-dimensional network structure. Specific examples of such an organohydrogenpolysiloxane are represented by the following average composition formula (3).

[Chem. 2]

$$H_aR^2_bSiO_{(4-a-b)/2} \quad (3)$$

In the formula (3), $R^2$ is an unsubstituted or substituted monovalent hydrocarbon group without aliphatic unsaturated bonds and may be the same or different, and a and b are $0<a<2$ and $0.8\leq b\leq 2$, respectively, and numbers satisfying $0.8<a+b\leq 3$.

Examples of the unsubstituted or substituted monovalent hydrocarbon group without aliphatic unsaturated bonds include those exemplified as $R^1$ in the formulas (1-1) to (1-3) and the formula (2).

These organohydrogenpolysiloxanes may be used singly or in combination of two or more kinds thereof. Preferably, the component (b) contains 50% by weight or less of organohydrogenpolysiloxane having two hydrosilyl groups and the organohydrogenpolysiloxane having at least three hydrosilyl groups as a residual content thereof per 100% by weight of the total amount.

The weight average molecular weight (Mw) of the crosslinking agent is, for example, 200 or more, preferably 500 or more, more preferably 1,000 or more from the viewpoint of facilitating the addition reaction, and is, for example, 15,000 or less, preferably 5,000 or less, more preferably 1,500 or less from the viewpoint of preventing the silicone adsorption layer from becoming too soft.

Examples of the amount of the component (B) used include such an amount that the amount of hydrogen atoms in the component (b) is, for example, 0.5 to 4 mol, preferably 1 to 2.5 mol, per 1 mol of the component (a).

((c) Non-Reactive MQ Resin)

The non-reactive MQ resin as the component (c) is a silicone resin composed of an M unit ($R^3{}_3SiO_{1/2}$) and a Q unit ($SiO_{4^-1/2}$) and having no reactive functional group such as a vinyl group or a hydroxyl group in the molecule. When the component (c) is blended, the adsorption of the silicone adsorption layer is improved; however, when the crosslinkable composition is cured, the reaction between the crosslinkable group of the component (a) and the hydrosilyl group of the component (b) is inhibited, so that an unreacted hydrosilyl group remains, and the unreacted hydrosilyl group causes remnants of glue. However, in the present invention, the silicone adsorption layer exhibits excellent suppression of remnants of glue while containing the component (c).

In the M unit constituting the non-reactive MQ resin, $R^3$ is an unsubstituted or substituted hydrocarbon group having 1 to 10 carbon atoms and may be the same or different, specific examples thereof include alkyl groups such as a methyl group, an ethyl group, a propyl group, an isopropyl group, a butyl group, an isobutyl group, a tert-butyl group, a pentyl group, a neopentyl group, a hexyl group, a heptyl group, and an octyl group; cycloalkyl groups such as a cyclopentyl group, a cyclohexyl group, and a cycloheptyl group; and aryl groups such as a phenyl group, a tolyl group, a xylyl group, and a naphthyl group, an alkyl group is preferably mentioned, and a methyl group is more preferably mentioned.

In the non-reactive MQ resin, a molar ratio (M unit/Q unit) of the M unit to the Q unit is, for example, 0.6 or more from the viewpoint of improving the adsorption of the silicone adsorption layer, and is, for example, 1.8 or less from the viewpoint of improving the suppression of remnants of glue.

These non-reactive MQ resins may be used singly or in combination of two or more kinds thereof.

The weight average molecular weight (Mw) of the non-reactive MQ resin is, for example, 100,000 or more, preferably 150,000 or more, more preferably 170,000 or more from the viewpoint of improving the adsorption of the silicone adsorption layer, and is, for example, 300,000 or less, preferably 250,000 or less, more preferably 200,000 or less from the viewpoint of preventing plastic deformation of the silicone adsorption layer.

The content of the component (c) in the crosslinkable composition is, for example, 43 to 100 parts by weight per 100 parts by weight of a total amount of the components (a) and (b). The content of the component (c) is preferably 43 parts by weight or more from the viewpoint of improving the adsorption of the silicone adsorption layer, and the content of the component (c) is preferably 100 parts by weight or less from the viewpoint of improving the suppression of remnants of glue. The content is preferably 61 to 100 parts by weight, more preferably 78 to 100 parts by weight, and still more preferably 90 to 100 parts by weight from the viewpoint of further preferably obtaining these effects or further improving easy detachability.

((d) Reactive MQ Resin)

The reactive MQ resin as the component (d) is composed of the M unit and the Q unit, and is an MQ resin having a silanol group in the molecule. By blending the component (d) in the crosslinkable composition, the unreacted hydrosilyl group remaining due to the presence of the component (c) at the time of curing of the crosslinkable composition is reduced by reacting with the silanol group of the component (d), so that the remnants of glue can be prevented without reducing the adsorption power of the silicone adsorption layer improved by the component (c). Although the component (d) is not as good as the component (c), the component (d) also has an effect of improving the adsorption of the silicone adsorption layer.

The reactive MQ resin is a silicone resin composed of a $M^1$ unit ($(OH)_cR^4{}_{(3-c)}SiO_{1/2}$) and optionally a $M^2$ unit ($R^5{}_3SiO_{1/2}$) and the Q unit ($SiO_{4^-1/2}$). In the $M^1$ unit, $R^4$ is an unsubstituted or substituted hydrocarbon group having 1 to 10 carbon atoms and may be the same or different, and in the $M^2$ unit, $R^5$ is an unsubstituted or substituted hydrocarbon group having 1 to 10 carbon atoms and may be the same or different. Specific examples of $R^4$ and $R^5$ include those exemplified as $R^3$ in a non-reactive resin as the component (c). c is an integer of 1 to 3, preferably 1 or 2, and more preferably 1.

In the reactive MQ resin, a ratio of OH groups per a total amount of the OH group of the $M^1$ unit and an $R^4$ group and an $R^5$ group of the $M^2$ unit is, for example, 0.5 mol % or more, preferably 1 mol % or more, from the viewpoint of further preferably obtaining the effect of preventing the remnants of glue, and is, for example, 10 mol % or less, preferably 5 mol % or less, from the viewpoint of further preferably obtaining the adsorption of the silicone adsorption layer.

In the reactive MQ resin, a total molar ratio (($M^1$ unit+$M^2$ unit)/Q unit) of the $M^1$ unit and the $M^2$ unit to the Q unit is, for example, 0.5 or more, preferably 0.6 or more, from the viewpoint of further preferably obtaining the effect of preventing the remnants of glue, and is, for example, 1.2 or less, preferably 0.9 or less, from the viewpoint of further preferably obtaining the adsorption of the silicone adsorption layer.

These reactive MQ resins may be used singly or in combination of two or more kinds thereof.

The weight average molecular weight (Mw) of the reactive MQ resin is, for example, 100 to 30,000, preferably 3,000 to 20,000, more preferably 6,000 to 10,000 from the viewpoint of preferably obtaining the adsorption and the suppression of remnants of glue.

The content of the component (d) in the crosslinkable composition is, for example, 1.1 to 10.6 parts by weight per 100 parts by weight of the total amount of the components (a) and (b). The content of the component (d) is preferably 1.1 parts by weight or more from the viewpoint of improving the suppression of remnants of glue, and the content of the component (d) is preferably 10.6 parts by weight or less from the viewpoint of improving the adsorption of the silicone adsorption layer. From the viewpoint of further preferably obtaining these effects, the content is, for example, preferably 1.1 to 1.5 parts by weight or 6 to 10.6 parts by weight, and preferably 1.1 to 1.3 parts by weight or 9 to 10.6 parts by weight.

The content of the component (d) per 100 parts by weight of the component (c) in the crosslinkable composition is, for example, 1 part by weight or more from the viewpoint of improving the suppression of remnants of glue, and is, for example, 11 parts by weight or less from the viewpoint of improving the adsorption of the silicone adsorption layer. From the viewpoint of further preferably obtaining these effects, the content of the component (d) per 100 parts by weight of the component (c) is, for example, preferably 1 to 2 parts by weight or 8 to 11 parts by weight, more preferably 1 to 1.5 parts by weight or 9 to 11 parts by weight.

(Other Components)

The crosslinkable composition may contain, in addition to the components (a) to (d), an addition reaction catalyst, a solvent, and the like as necessary.

Examples of the addition reaction catalyst include platinum-based catalysts. Specific examples of the platinum-based catalyst include chloroplatinic acids such as tetrachloroplatinous acid and hexachloroplatinic acid, alcohol compounds and aldehyde compounds of chloroplatinic acid, and chain salts of chloroplatinic acid and various olefins. These addition reaction catalysts may be used singly or in combination of two or more kinds thereof. The amount of the addition reaction catalyst used is, for example, 1.5 to 2.5 parts by weight per 100 parts by weight of the total amount of the components (a) and (b).

The solvent can be used from the viewpoint of adjusting the viscosity of the crosslinkable composition, and specific examples thereof include aromatic hydrocarbon-based solvents such as toluene and xylene, aliphatic hydrocarbon-based solvents such as hexane, heptane, octane, and isoparaffin, ketone-based solvents such as methyl ethyl ketone and methyl isobutyl ketone, ester-based solvents such as ethyl acetate and isobutyl acetate, and ether-based solvents such as diisopropyl ether and 1,4-dioxane. These solvents may be used singly or in combination of two or more kinds thereof. The amount of the solvent used is, for example, 25 to 40% by weight, preferably 30 to 40% by weight in the crosslinkable composition. The crosslinkable composition may be of any of a solvent-free type, a solvent type, and an emulsion type, and thus may be solvent-free.

(Thickness)

A person skilled in the art can appropriately set the thickness of the silicone adsorption layer such that a shear force in an adhesion surface direction of the silicone adsorption layer to the adherend can be secured. The thickness is, for example, preferably 10 μm or more, more preferably 15 μm or more, still more preferably 20 μm or more, and even more preferably 25 μm or more from the viewpoint of improving the adsorption of the silicone adsorption layer, and is, for example, preferably 50 μm or less, more preferably 30 μm or less, still more preferably 25 μm or less, and even more preferably 20 μm or less from the viewpoint of improving the suppression of remnants of glue.

(Forming Method)

The silicone adsorption layer can be formed by forming a coating layer of the crosslinkable composition on a base material film constituting the base material layer and performing a crosslinking reaction.

Examples of the method of applying the crosslinkable composition include a roll coater, a bar coater, a floating knife coater, a die coater, a gravure coater, a curtain coater, and a blade coater.

Conditions of the crosslinking reaction are not particularly limited as long as the component (a) and the component (b) can be thermally crosslinked by an addition reaction, and examples thereof include thermal crosslinking conditions of 160° C. or lower, preferably 100 to 160° C., and more preferably 130 to 150° C.

(Storage Elastic Modulus)

A storage elastic modulus (G') of the silicone adsorption layer at 23° C. is, for example, $5\times10^4$ to $15\times10^4$ Pa from the viewpoint of obtaining more excellent adsorption and suppression of remnants of glue. From the viewpoint of further preferably obtaining the adsorption, the storage elastic modulus (G') of the silicone adsorption layer at 23° C. is, for example, preferably $6.5\times10^4$ to $15\times10^4$ Pa, more preferably $7\times10^4$ to $15\times10^4$ Pa, and still more preferably $7.5\times10^4$ to $15\times10^4$ Pa. For control of the storage elastic modulus, for example when the storage elastic modulus is increased, the storage elastic modulus can be controlled by increasing a blending ratio of the component (c) and the component (d), preferably by increasing a blending ratio of the component (d), and when the storage elastic modulus is decreased, the storage elastic modulus can be controlled by decreasing the blending ratio of the component (c) and the component (d), preferably by decreasing the blending ratio of the component (d). The storage elastic modulus is a value measured by the method described in Examples.

(Adsorption and Easy Detachability)

The silicone adsorption layer is excellent in adsorption to a smooth surface, and is also excellent in properties (easy detachability) that allow easy detachment after adsorption to the smooth surface. A detachment force of the silicone adsorption layer is, for example, 350 to 7,500 mN/25 mm, preferably 500 to 6,500 mN/25 mm, more preferably 800 to 5,000 mN/25 mm, from the viewpoint of obtaining further excellent adsorption and easy detachability. With such a detachment force, when the silicone adsorption layer is used for fixing the polishing member P (polishing pad) to the platen S as shown in FIG. 6, even if polishing work is speeded up, performance that partial detachment hardly occurs between the silicone adsorption layer 2 and the platen S, easy detachability of the silicone adsorption film 10*a* from the platen S, and performance of preventing the remnants of glue to the platen S after detachment can coexist. The detachment force of the silicone adsorption layer is a detachment force with respect to a stainless steel surface, and specifically, is a value measured by the method shown in Examples.

Pressure-Sensitive Adhesive Layer

The pressure-sensitive adhesive layer is provided for the purpose of bonding and fixing the polishing member.

Examples of the material of the pressure-sensitive adhesive layer include a pressure-sensitive adhesive composition containing a (meth)acrylic resin and an isocyanate-based crosslinking agent.

Examples of the (meth)acrylic resin include copolymers of an alkyl (meth)acrylate having no hydroxyl group and a monomer having a hydroxyl group.

Examples of the alkyl group in the alkyl(meth) acrylate having no hydroxyl group include linear or branched alkyl groups having 1 to 18, preferably 1 to 8, and more preferably 1 to 4 carbon atoms, and specific examples of the alkyl (meth)acrylate having no hydroxyl group include methyl (meth)acrylate, ethyl (meth)acrylate, n-butyl (meth)acrylate, isobutyl (meth)acrylate, sec-butyl (meth)acrylate, tert-butyl (meth)acrylate, n-octyl (meth)acrylate, isooctyl (meth)acrylate, 2-ethylhexyl (meth)acrylate, n-nonyl (meth)acrylate, isononyl (meth)acrylate, n-decyl (meth)acrylate, n-dodecyl (meth)acrylate, and stearyl (meth)acrylate.

Examples of the monomer having a hydroxyl group include hydroxyalkyl (meth)acrylate and the other monomers having a hydroxyl group. Examples of the alkyl group in hydroxyalkyl (meth)acrylate include linear or branched alkyl groups having 1 to 18, preferably 1 to 8, and more preferably 1 to 4 carbon atoms, and specific examples of (meth)acrylate having a hydroxyl group include hydroxyalkyl (meth)acrylates represented by 2-hydroxyethyl (meth) acrylate, 2-hydroxypropyl (meth)acrylate, 3-hydroxypropyl (meth)acrylate, 4-hydroxybutyl (meth)acrylate, 3-methyl-3-hydroxybutyl (meth)acrylate, 1,1-dimethyl-3-hydroxybutyl (meth)acrylate, 1,3-dimethyl-3-hydroxybutyl (meth)acrylate, 2,2,4-trimethyl-3-hydroxypentyl (meth)acrylate, and 2-ethyl-3-hydroxyhexyl (meth)acrylate. Examples of other monomers having a hydroxyl group include glycerin mono (meth)acrylate, polypropylene glycol mono(meth)acrylate, polyethylene glycol mono(meth)acrylate, poly(ethylene glycol-propylene glycol) mono(meth)acrylate, and N-methylol acrylamide.

The weight average molecular weight (Mw) of the (meth) acrylic resin is, for example, 100,000 to 1,000,000, preferably 300,000 to 800,000, and more preferably 400,000 to 600,000.

Examples of the isocyanate-based crosslinking agent include diisocyanates such as hexamethylene diisocyanate, toluene diisocyanate, and isophorone diisocyanate, triisocyanates such as tris(phenyl isocyanate)thiophosphate, and polyvalent isocyanates having isocyanurates.

The thickness of the pressure-sensitive adhesive layer is, for example, 30 to 150 μm, and preferably 40 to 80 μm.

In a method of stacking the pressure-sensitive adhesive layer, the pressure-sensitive adhesive composition may be applied and dried on the base material layer on which the silicone adsorption layer is stacked to form a coating layer, or a silicone adsorption laminate of the base material layer and the silicone adsorption layer may be provided, a cover film may be separately provided, the pressure-sensitive adhesive composition may be applied and dried on a release layer of the cover film to form a coating layer, and the coating layer may be stacked with the base material layer side of the silicone adsorption laminate facing the coating layer.

Anchor Layer

The anchor layer provided as necessary can be provided for the purpose of improving an adhesive force between the base material layer and the silicone adsorption layer or achieving smooth detachment from the smooth surface without detachment between the base material layer and the silicone adsorption layer when the silicone adsorption film is detached after the silicone adsorption film is stuck to the smooth surface. The anchor layer is particularly useful in the case of a combination in which the silicone adsorption layer and the base material layer are difficult to directly bond to each other. On the other hand, in the case of a combination in which the silicone adsorption layer and the base material layer are easily directly bonded to each other, the anchor layer may or may not be provided.

Examples of the material of the anchor layer include polyester-based resins, acrylic resins, and urethane-based resins. From the viewpoint of antistatic properties and/or film properties, the material of the anchor layer is, for example, preferably an acrylic resin, and more preferably an acrylic polyol resin.

The material of the anchor layer may further contain an antistatic agent for the purpose of further imparting antistatic performance. Examples of the antistatic agent include nonionic antistatic agents such as polyoxyethylene alkyl ether, polyoxyethylene alkylphenol, polyoxyethylene alkylamine, polyoxyethylene alkylamide, fatty acid polyethylene glycol ester, fatty acid sorbitan ester, polyoxyethylene fatty acid sorbitan ester, fatty acid glycerin ester, and alkylpolyethyleneimine; acrylate-based antistatic agents such as an acrylate compound having ethylene oxide; conductive polymers such as polyaniline, polypyrrole, polythiophene, poly3,4-ethylenedioxythiophene, and derivatives thereof; and conductive metal oxides such as antimony-doped tin oxide (ATO), tin-doped indium oxide (ITO), aluminum-doped zinc oxide, and antimony sub-oxide, the antistatic agent is, for example, preferably a conductive polymer and more preferably polythiophene. The anchor layer containing the antistatic agent is particularly useful when a base material layer having no antistatic performance is used. On the other hand, when the base material layer itself has the antistatic performance (for example, when the surface is subjected to antistatic treatment), the anchor layer containing the antistatic agent may or may not be provided.

The thickness of the anchor layer is, for example, 0.1 μm or more, preferably 1.0 μm or more from the viewpoint of improving the adhesiveness between the base material layer and the silicone adsorption layer, and from the viewpoint of more effectively obtaining the antistatic performance when the antistatic performance is also imparted, and the thickness is, for example, 5.0 μm or less, preferably 3.0 μm or less from the viewpoint of maintaining the flexibility of the entire silicone adsorption film and facilitating the attachment and detachment of the silicone adsorption film from the smooth surface.

The anchor layer can be film-formed by forming a coating layer of the resin composition for an anchor layer containing the above materials and drying the coating layer. Examples of the method of applying the resin composition for an anchor layer include a roll coater, a bar coater, a floating knife coater, a die coater, a gravure coater, a curtain coater, and a blade coater.

Examples of a method of stacking the anchor layer include an in-line method in which film-formation and stacking of the anchor layer are simultaneously performed, and an off-line method in which the anchor layer is separately formed as a film and then stacked.

Separator

The separator is used by being bonded to the silicone adsorption layer side for the purpose of preventing dirt and foreign matter from adhering to the surface of the silicone adsorption layer and improving handling of the silicone adsorption film. The separator may be a film constituted of the base material layer 5 as in the separator 20 illustrated in FIG. 4, or may be a stacked film including the base material layer 5 and the release layer 6 stacked on the base material layer 5 as in the separator 20*a* illustrated in FIG. 5.

Examples of the material of the base material layer in the separator include a silicone-based release agent and a fluorine-based release agent, and is, for example, preferably a release agent containing fluorosilicone. The thickness of the base material layer is also the same as the thickness of the base material layer in the silicone adsorption film.

Examples of the material of the release layer in the separator include a silicone-based release agent and a fluorine-based release agent, and is, for example, preferably a fluorine-based release agent. Examples of the fluorine-based release agent include a resin composition for a release layer containing a copolymer of a fluoroolefin, a cyclohexyl group-containing acrylic acid ester, and a hydroxyl group-containing vinyl ether, and an isocyanate-based crosslinking agent (diisocyanates such as hexamethylene diisocyanate, toluene diisocyanate, and isophorone diisocyanate, triisocyanates such as tris(phenyl isocyanate) thiophosphate, polyvalent isocyanates having isocyanurates, and the like).

As a method of forming the release layer, the release layer can be formed by forming a coating layer of the resin composition for a release layer on a base material film constituting the base material layer and performing the crosslinking reaction. Examples of the method of applying the resin composition for a release layer include a roll coater, a bar coater, a floating knife coater, a die coater, a gravure coater, a curtain coater, and a blade coater.

The thickness of the release layer is, for example, 0.05 to 0.5 μm, and preferably 0.1 to 0.3 μm.

Cover Film

The cover film is used by being bonded to the pressure-sensitive adhesive layer side for the purpose of protecting the pressure-sensitive adhesive layer until the polishing member is bonded to the silicone adsorption film including a pressure-sensitive adhesive layer 3 as in the silicone adsorption film 10*a* shown in FIG. 2. The cover film is preferably a stacked film including the base material layer 7 and the release layer 8 stacked on the base material layer 7 as in the cover film 30 illustrated in FIGS. 4 and 5.

The material of the base material layer in the cover film is the same as those mentioned as the base material layer in the silicone adsorption film. The thickness of the base material layer is also the same as the thickness of the base material layer in the silicone adsorption film. Examples of the material of the release layer in the cover film include a silicone-based release agent and a fluorine-based release agent, and is, for example, preferably a silicone-based release agent. The thickness of the release layer is, for example, 0.05 to 0.5 μm, and preferably 0.1 to 0.3 μm.

Method of Use

The silicone adsorption film of the present invention is used to fix the polishing pad by being interposed between the platen S of the polishing apparatus and the polishing member P (polishing pad), for example, as shown in FIG. 6. Examples of an object to be polished of the polishing member P include substrate surfaces such as a semiconductor wafer, a substrate for a hard disk, and a glass substrate for a display, which are polished in a manufacturing process of a semiconductor component and an electronic component. Since the silicone adsorption film of the present invention is excellent in adsorption, the silicone adsorption film is particularly preferably used when high-speed polishing is performed. A degree of high-speed polishing is, for example, 80 to 100 rpm, preferably 85 to 95 rpm as a rotation speed of a polishing platen to which the polishing member is fixed, and is, for example, 80 to 100 rpm, preferably 85 to 95 rpm as a rotation speed of the head to which the object to be polished is fixed. The polishing platen to which the polishing member is fixed and the head to which the object to be polished is fixed are rotated in the same direction.

EXAMPLES

Hereinafter, the present invention will be described in detail with reference to examples and comparative examples, but the present invention is not limited to the following examples. It should be noted that the term “parts” in each example refers to parts by weight unless otherwise specified. The weight average molecular weight is a polystyrene equivalent value measured and calculated using a GPC measuring machine (model number: Waters 410) manufactured by Waters Corporation.

1. Material of Silicone Adsorption Film 1-1. Film for Base Material Layer

A polyethylene terephthalate film having both surfaces plasma-treated and a thickness of 50 μm was used. A surface resistance value of this polyethylene terephthalate film was $5.1\times10^{11}$ Ω/A.

1-2. Crosslinkable Composition for Silicone Adsorption Layer

A crosslinkable composition for a silicone adsorption layer having the composition shown in Table 1 was prepared. A diorganopolysiloxane having two or more alkenyl groups in one molecule and having a weight average molecular weight of 77,844 was used as the “crosslinkable organopolysiloxane” as the component (a), an organohydrogenpolysiloxane having a weight average molecular weight of 1,240 was used as the “crosslinking agent” as the component (b), a non-reactive MQ resin having a weight average molecular weight of 175,000 was used as the “non-reactive MQ resin” as the component (c), a reactive MQ resin having a weight average molecular weight of 6,610 was used as the “reactive MQ resin” as the component (d), toluene was used as a solvent, and CAT.PL-56 (manufactured by Shin-Etsu Silicone Co., Ltd.) was used as a platinum catalyst.

1-3. Resin Composition for Anchor Layer

A resin composition for an anchor layer having the following composition was prepared.

Acrylic polyol resin: 20 parts (COATAX (registered trademark) LH-455 manufactured by Toray Fine Chemicals Co., Ltd., solid content: 50%)

Polythiophene: 27 parts (SEPLEGYDA (registered trademark) OC-SC100 manufactured by Shin-Etsu Polymer Co., Ltd., solid content: 3%)

MEK: 40 parts

Toluene: 13 parts 1-4. Pressure-Sensitive Adhesive Composition

A pressure-sensitive adhesive composition having the following composition was prepared.

Acrylic copolymer: 100.0 parts—

(Hydroxybutyl acrylate, butyl acrylate copolymer, weight average molecular weight Mw: about 500,000, solid content: 37%)

Hexamethylene diisocyanate: 0.05 parts (Solid content: 37.5%)

2. Material of Separator 2-1. Film for Base Material Layer

A polyethylene terephthalate film having a thickness of 50 μm was used.

2-2. Resin Composition for Release Layer

A resin composition for a release layer having the following composition was prepared.

Fluorosilicone: 3.23 parts (Shin-Etsu Chemical Co., Ltd., X-70-2015, solid content ratio: 15.00%)

Hydrofluoroether (75%) and meta-xylene hexafluoride (25%)

10.50 parts in total

Isooctane: 10.50 parts

Platinum catalyst CAT.PL-56: 0.02 parts

3. Material of Cover Film 3-1. Film for Base Material Layer

A polyethylene terephthalate film having a thickness of 50 μm was used.

3-2. Resin Composition for Release Layer

A silicone-based release agent was used.

4. Preparation of Separator

A resin composition for a release layer (material of a separator) was applied to one surface of a film for a base material layer (material of a separator) with a die coater under an environment of 23° C. and 50% RH, and then crosslinked at a dryer temperature of 150° C. for a residence time of 100 seconds to form a 0.15 μm release layer, thereby preparing a separator. This separator corresponded to the separator 20*a* shown in FIG. 5.

5. Preparation of Cover Film

A silicone-based release agent was applied to one surface of a film for a base material layer (material of a cover film) to form a 0.15 μm release layer, thereby preparing a cover film. This cover film corresponded to the cover film 30 shown in FIGS. 4 and 5.

6. Preparation of Silicone Adsorption Film

Example 5

A crosslinkable composition for a silicone adsorption layer was applied and provided on one surface of a film for a base material layer (material of a silicone adsorption film) with a die coater under an environment of 23° C. and 50% RH, and then crosslinked in an oven at 150° C. for 100 seconds to form a silicone adsorption layer having a thickness shown in Table 1. As a result, a silicone adsorption film in which the silicone adsorption layer was stacked on the base material layer was prepared. This silicone adsorption film corresponded to the silicone adsorption film 10 shown in FIG. 1.

A surface of the silicone adsorption layer 2 of the silicone adsorption film 10 and a surface of the release layer 6 of the separator 20*a* were sandwiched between two rolls (a rubber roll and a metal roll) in a state where the surface of the release layer 6 faced the surface of the silicone adsorption layer 2, and were bonded to each other while releasing air. As a result, the silicone adsorption film 10 with the separator 20*a* was obtained.

The pressure-sensitive adhesive composition was applied onto the release layer 8 of the cover film 30 with a die coater, and heated and dried at 100° C. for 2 minutes to form the pressure-sensitive adhesive layer 3 having a thickness of 50 μm.

A surface of the base material layer 1 of the silicone adsorption film 10 with a separator and the pressure-sensitive adhesive layer 3 formed on the cover film 30 were sandwiched between two rolls (a rubber roll and a metal roll) in a state where the pressure-sensitive adhesive layer 3 faced the surface of the base material layer 1, and were bonded to each other while releasing air. As a result, the silicone adsorption film 10*a* having a configuration in which the pressure-sensitive adhesive layer 3 was further stacked was obtained. The silicone adsorption film 10*a* had an aspect in which the separator 20*a* was stacked on the silicone adsorption layer 2 side and the cover film 30 was stacked on the pressure-sensitive adhesive layer 3 side (see FIG. 5).

Examples 1 to 4 and 6 to 9 and Comparative Examples 1 to 3

A resin composition for an anchor layer was applied to one surface of a film for a base material layer (material of a silicone adsorption film) with a gravure coater and dried to form an anchor layer having a thickness of 2 μm. A crosslinkable composition for a silicone adsorption layer was applied and provided on the formed anchor layer with a die coater under an environment of 23° C. and 50% RH, and then crosslinked in an oven at 150° C. for 100 seconds to form a silicone adsorption layer having a thickness shown in Table 1. As a result, a silicone adsorption film in which the silicone adsorption layer was stacked on the base material layer with the anchor layer interposed therebetween was prepared. This silicone adsorption film corresponded to the silicone adsorption film 10*b* shown in FIG. 3.

A surface of the silicone adsorption layer 2 of the silicone adsorption film 10*b* and the surface of the release layer 6 of the separator 20*a* were sandwiched between two rolls (a rubber roll and a metal roll) in a state where the surface of the release layer 6 faced the surface of the silicone adsorption layer 2, and were bonded to each other while releasing air. As a result, the silicone adsorption film 10*b* with the separator 20*a* was obtained.

The pressure-sensitive adhesive composition was applied onto the release layer 8 of the cover film 30 with a die coater, and heated and dried at 100° C. for 2 minutes to form the pressure-sensitive adhesive layer 3 having a thickness of 50 μm.

A surface of the base material layer 1 of the silicone adsorption film 10*b* with the separator 20*a* and the pressure-sensitive adhesive layer 3 formed on the cover film 30 were sandwiched between two rolls (a rubber roll and a metal roll) in a state where the pressure-sensitive adhesive layer 3 faced the surface of the base material layer 1, and were bonded to each other while releasing air. As a result, a silicone adsorption film having a configuration in which the pressure-sensitive adhesive layer 3 was further stacked on the silicone adsorption film 10*b* was obtained. The silicone adsorption film had an aspect in which the separator 20*a* was stacked on the silicone adsorption layer 2 side and the cover film 30 was stacked on the pressure-sensitive adhesive layer 3 side.

7. Measurement of Storage Elastic Modulus of Silicone Adsorption Layer

A crosslinkable composition for a silicone adsorption layer was applied and provided on one surface of a fluororesin sheet having a thickness of 50 μm with a die coater under an environment of 23° C. and 50% RH, and then crosslinked in an oven at 150° C. for 100 seconds to form a silicone adsorption layer having a thickness of 50 μm. The obtained silicone adsorption layer was peeled off from the fluororesin sheet to prepare a test piece for viscoelasticity measurement. Using a viscoelasticity tester (manufactured by Rheology Co., Ltd., trade name: MR-300), a test piece was sandwiched between parallel disks, which are measurement sections of the tester, and the storage elastic modulus (G') at 23° C. was measured at a frequency of 1 Hz. The measurement results are shown in Table 1.

8. Evaluation of Silicone Adsorption Film 8-1. Adsorption

The cover film was detached to expose the pressure-sensitive adhesive layer of the silicone adsorption film, the separator was detached to expose the silicone adsorption layer of the silicone adsorption film, as illustrated in FIG. 6, the silicone adsorption film was interposed between the polishing pad and the platen of the polishing apparatus so that the pressure-sensitive adhesive layer 3 side faced the polishing pad P and the silicone adsorption layer 2 side faced the platen S of the polishing apparatus, and the polishing pad was fixed to the platen of the polishing apparatus.

High-speed polishing of 10 sheets of objects to be polished was performed using the polishing apparatus in which the polishing pad was fixed as described above. The polishing conditions were as follows.

Polishing apparatus: FREX 300E manufactured by Ebara Corporation

Polishing pad: IC1000/SUBA400 (manufactured by Nitta Haas)

Polishing pressure: 2.0 psi (1 psi=6894.76 Pa, the same applies hereinafter)

Rotation speed of polishing platen: 90 rpm

Head rotation speed: 91 rpm

Supply of polishing composition: flowing

Polishing composition: 5% aqueous silica slurry

Object to be polished: Silicon wafer (000 mm)

Supply amount of polishing composition: 300 ml/min

Polishing time: 10 minutes

After polishing, whether the silicone adsorption layer of the silicone adsorption film used for fixing the polishing pad was detached was visually confirmed, and the adsorption was evaluated based on the following criteria. The results are shown in Table 1.

⊙: There is no detachment of the silicone adsorption layer, and excellent adsorption suitable for high-speed polishing is obtained.

○: Although there is slight detachment at an end of the silicone adsorption layer, there is no problem in practical use of high-speed polishing.

x: The silicone adsorption layer is detached and cannot withstand practical high-speed polishing.

8-2. Suppression of Remnants of Glue

The silicone adsorption film 10 with the separator 20*a* and the silicone adsorption film 10*b* with the separator 20*a* were cut into a shape of 100 mm in length x 25 mm in width to obtain samples for evaluation. The separator 20*a* was detached from the sample under an environment of 23° C. and 50% RH, the exposed surface of the silicone adsorption layer 2 was attached to a polished stainless steel plate (SUS plate), press-bonded by reciprocating a 2 kg roller once, and left to stand for 24 hours under an atmosphere of 23° C. Thereafter, next, using a tensile tester, detachment was performed at a detachment angle of 180° and a detachment rate of 300 mm/min, whether or not a surface of the SUS plate was contaminated (remnants of glue) was observed, and evaluation was performed according to the following criteria. The evaluation results are shown in Table 1.

⊙: No remnant of glue can be confirmed on the SUS plate, and extremely excellent reworkability is exhibited.

○: There are slight remnants of glue on the SUS plate, the reworkability itself is good, and there is no problem in practical use.

x: There are significant remnants of glue on the SUS plate, and a poor practical use is exhibited.

8-3. Easy Detachability

A silicone adsorption film in which a silicone adsorption layer was stacked on a polyester film having a thickness of 100 μm with the anchor layer interposed therebetween was prepared, and the silicone adsorption film was cut into a shape of 100 mm in length×25 mm in width to prepare a sample for evaluation. The silicone adsorption layer of the sample for evaluation was attached to a polished stainless steel plate (SUS plate) having a thickness of 2 mm, press-bonded by reciprocating a 2 kg roller once, and left to stand for 24 hours under an atmosphere of 23° C. Next, using a tensile tester, detachment was performed at a detachment angle of 180° and a detachment rate of 1200 mm/min, and the detachment force (mN/25 mm) from the stainless steel plate was measured. The measurement results are shown in Table 1. Based on the measurement results, samples were classified and evaluated into "++++" (less than 100 mN/25 mm), "+++" (100 mN/25 mm or more and less than 800 mN/25 mm), "++" (800 mN/25 mm or more and less than 2200 mN/25 mm), "+" (2200 mN/25 mm or more and less than 5000 mN/25 mm), and "−" (5000 mN/25 mm or more) in descending order of easy detachability. The evaluation results are shown in Table 1.

TABLE 1

| | | Example | | | | | | | | | Comparative Example | | |
|---|---|---|---|---|---|---|---|---|---|---|---|---|---|
| | | 1 | 2 | 3 | 4 | 5 | 6 | 7 | 8 | 9 | 1 | 2 | 3 |
| Crosslinkable composition for silicone adsorption layer | (a) Crosslinkable organopolysiloxane + (b) crosslinking agent | 100 | 100 | 100 | 100 | 100 | 100 | 100 | 100 | 100 | 100 | 100 | 100 |
| | (c) Non-reactive MQ resin | 98 | 98 | 63 | 63 | 63 | 44 | 44 | 98 | 98 | 0 | 100 | 0 |
| | (d) Reactive MQ resin | 1.21 | 1.21 | 1.67 | 1.67 | 1.67 | 1.93 | 1.93 | 10.54 | 10.54 | 17.86 | 0 | 0 |
| | Solvent | 135 | 135 | 123 | 123 | 123 | 111 | 117 | 139 | 139 | 139 | 190 | 128 |
| | Platinum catalyst | 2.22 | 2.22 | 1.83 | 1.83 | 1.83 | 1.63 | 1.63 | 2.32 | 2.32 | 1.31 | 2.22 | 1.11 |
| Presence or absence of anchor layer | | Presence | Presence | Presence | Presence | Absence | Presence | Presence | Presence | Presence | Presence | Presence | Presence |

TABLE 1-continued

| | | Example | | | | | | | | | Comparative Example | | |
|---|---|---|---|---|---|---|---|---|---|---|---|---|---|
| | | 1 | 2 | 3 | 4 | 5 | 6 | 7 | 8 | 9 | 1 | 2 | 3 |
| Silicone adsorption layer | Storage elastic modulus (×$10^4$ Pa) | 7.5 | 7.5 | 6.7 | 6.7 | 6.7 | 5.2 | 5.2 | 15.0 | 15.0 | 23.0 | 1.3 | 4.8 |
| | Thickness (μm) | 16 | 27 | 16 | 27 | 16 | 16 | 27 | 16 | 27 | 27 | 27 | 27 |
| Silicone adsorption film | Adsorption | ⊙ | ⊙ | ○ | ⊙ | ⊙ | ○ | ○ | ⊙ | ⊙ | X | ⊙ | X |
| | Suppression of remnants of glue | ⊙ | ○ | ⊙ | ⊙ | ⊙ | ⊙ | ⊙ | ⊙ | ⊙ | ⊙ | X | ⊙ |
| | Detachment strength (mN/25 mm) | 4809 | 7086 | 502 | 1253 | 505 | 520 | 371 | 850 | 1022 | 20 | 7051 | 20 |
| | Easy detachability | + | − | +++ | ++ | +++ | +++ | +++ | ++ | ++ | ++++ | − | ++++ |

The unit of the numerical value indicating the content of each component contained in the crosslinkable composition for a silicone adsorption layer is part(s) by weight.

As shown in Table 1, in a silicone adsorption film including a base material layer and a silicone adsorption layer stacked on the base material layer, in which the silicone adsorption layer was a cured product of a crosslinkable composition containing (a) the crosslinkable organopolysiloxane and (b) the crosslinking agent, when the crosslinkable composition did not contain any one or both of (c) the non-reactive MQ resin and (d) the reactive MQ resin (Comparative Examples 1 to 3), although both the adsorption of the silicone adsorption layer and the suppression of remnants of glue in the silicone adsorption film could not be achieved, when the crosslinkable composition contained both of (c) the non-reactive MQ resin and (d) the reactive MQ resin (Examples 1 to 9), both the adsorption of the silicone adsorption layer and the suppression of remnants of glue in the silicone adsorption film could be achieved.

DESCRIPTION OF REFERENCE SIGNS

10, 10*a*, 10*b*: Silicone adsorption film
1: Base material layer
2: Silicone adsorption layer
3: Pressure-sensitive adhesive layer
4: Anchor layer
20, 20*a*: Separator
5: Base material layer
6: Release layer
30: Cover film
7: Base material layer
8: Release layer
S: Platen
P: Polishing member (polishing pad)

The invention claimed is:

1. A silicone adsorption film comprising:
a base material layer; and
a silicone adsorption layer stacked on the base material layer,
wherein the silicone adsorption layer is a cured product of a crosslinkable composition containing (a) a crosslinkable organopolysiloxane, (b) a crosslinking agent, (c) a non-reactive MQ resin, and (d) a reactive MQ resin, and
wherein 43 to 100 parts by weight of the component (c) and 1.1 to 10.6 parts by weight of the component (d) are contained per 100 parts by weight of a total amount of the component (a) and the component (b).

2. The silicone adsorption film according to claim 1, wherein the component (a) is a diorganopolysiloxane having two or more alkenyl groups in one molecule.

3. The silicone adsorption film according to claim 1, wherein the component (b) is an organohydrogenpolysiloxane.

4. The silicone adsorption film according to claim 1, wherein a thickness of the silicone adsorption layer is 15 to 30 μm.

5. The silicone adsorption film according to claim 1, wherein a storage elastic modulus of the silicone adsorption layer is 5×$10^4$ to 15×$10^4$ Pa.

6. The silicone adsorption film according to claim 1, wherein an anchor layer is included between the base material layer and the silicone adsorption layer, and the anchor layer is selected from the group consisting of a polyester-based resin, an acryl-based resin, and a urethane-based resin.

7. A method of fixing a polishing member to a platen of a polishing apparatus comprising:
obtaining the silicon adsorption film according to claim 1,
fixing the silicon adsorption layer of the silicone adsorption film to the platen of the polishing apparatus, and
fixing the polishing member to a side of the base material layer of the silicon adsorption film opposite from the silicone adsorption layer.

8. The method of claim 7, wherein the polishing member is fixed to an adhesive layer that is located between the base material and the polishing member.

9. The silicone adsorption film according to claim 1, wherein 90 to 100 parts by weight of the component (c) and 9 to 10.6 parts by weight of the com-ponent (d) are contained per 100 parts by weight of a total amount of the component (a) and the component (b).

10. The silicone adsorption film according to claim 1, wherein:
component (a) has a weight average molecular weight of 70,000 to 100,000,
component (b) has a weight average molecular weight of 1,000 to 1,500,
component (c) has a weight average molecular weight of 170,000 to 200,000, and
component (d) has a weight average molecular weight of 6,000 to 10,000.

11. The silicone adsorption film according to claim 1, wherein:
component (a) has a weight average molecular weight of 70,000 to 100,000,
component (b) has a weight average molecular weight of 1,000 to 1,500,
component (c) has a weight average molecular weight of 170,000 to 200,000, component (d) has a weight average molecular weight of 6,000 to 10,000, and wherein a thickness of the silicone adsorption layer is 15 to 30 μm.

12. The silicone adsorption film according to claim 9, wherein:

component (a) has a weight average molecular weight of 70,000 to 100,000, component (b) has a weight average molecular weight of 1,000 to 1,500, component (c) has a weight average molecular weight of 170,000 to 200,000, and component (d) has a weight average molecular weight of 6,000 to 10,000.

13. The silicone adsorption film according to claim 9, wherein:

component (a) has a weight average molecular weight of 70,000 to 100,000, component (b) has a weight average molecular weight of 1,000 to 1,500, component (c) has a weight average molecular weight of 170,000 to 200,000, component (d) has a weight average molecular weight of 6,000 to 10,000, and wherein a thickness of the silicone adsorption layer is 15 to 30 μm.

* * * * *